(12) United States Patent
Argiolas (10) Patent No.: US 11,052,366 B2
(45) Date of Patent: Jul. 6, 2021

(54) EROSION MONITORING SYSTEM FOR COMPONENTS FOR FLUID BED CATALYTIC CRACKING PLANTS

(71) Applicant: REMOSA S.R.L, Cagliari (IT)

(72) Inventor: Cristian Argiolas, Cagliari (IT)

(73) Assignee: Remosa S.r.l., Cagliari (IT)

( * ) Notice: Subject to any disclaimer, the term of this patent is extended or adjusted under 35 U.S.C. 154(b) by 0 days.

(21) Appl. No.: 16/756,341

(22) PCT Filed: Oct. 15, 2018

(86) PCT No.: PCT/IB2018/057969
§ 371 (c)(1),
(2) Date: Apr. 15, 2020

(87) PCT Pub. No.: WO2019/077467
PCT Pub. Date: Apr. 25, 2019

(65) Prior Publication Data
US 2020/0330945 A1  Oct. 22, 2020

(30) Foreign Application Priority Data
Oct. 17, 2017  (IT) .................. 102017000116434

(51) Int. Cl.
| | |
|---|---|
| *B01J 8/00* | (2006.01) |
| *B01J 8/18* | (2006.01) |
| *B01J 8/24* | (2006.01) |
| *B01J 8/26* | (2006.01) |
| *C10G 11/18* | (2006.01) |
(Continued)

(52) U.S. Cl.
CPC .......... *B01J 8/1809* (2013.01); *B01J 8/0055* (2013.01); *B01J 8/1827* (2013.01); *B01J 8/26* (2013.01); *C10G 11/187* (2013.01); *C10G 75/00* (2013.01); *G01D 5/35316* (2013.01); *B01J 2208/00761* (2013.01); *B01J 2208/00902* (2013.01); *C10G 2300/4075* (2013.01)

(58) Field of Classification Search
CPC ... B01J 8/00; B01J 8/005; B01J 8/0055; B01J 8/18; B01J 8/1809; B01J 8/1818; B01J 8/1827; B01J 8/24; B01J 8/26; B01J 2208/00; B01J 2208/00743; B01J 2208/00761; B01J 2208/00796; B01J 2208/00893; B01J 2208/00902; C10G 11/00; C10G 11/14; C10G 11/18; C10G 11/187; C10G 75/00; C10G 2300/00; C10G 2300/40; C10G 2300/4075; G01D 5/00; G01D 5/26; G01D 5/32; G01D 5/34; G01D 5/353; G01D 5/35306; G01D 5/35309; G01D 5/35316
See application file for complete search history.

(56) References Cited

U.S. PATENT DOCUMENTS 6,267,873 B1 * 7/2001 Das ................. C10G 11/18
208/113
2015/0285705 A1 * 10/2015 Kumar ............. G01M 11/085
356/73.1

* cited by examiner

*Primary Examiner* — Natasha E Young
(74) *Attorney, Agent, or Firm* — R, Ruschena Patent Agent, LLC (57) ABSTRACT

An erosion monitoring system of components exposed to wear for use in systems equipped with a fluidized catalyst comprising a bundle of fiber optic sensors, said optical fibers being provided with one or more Bragg gratings, a processing unit and the fiber optic sensors depart off from the bundle and are positioned transversely to the wall exposed to erosion wear due to the erosion of the components to be monitored.

14 Claims, 7 Drawing Sheets

(51) Int. Cl.
*G01D 5/00* (2006.01)
*G01D 5/26* (2006.01)
*G01D 5/32* (2006.01)
*G01D 5/34* (2006.01)
*C10G 75/00* (2006.01)
*G01D 5/353* (2006.01)

EROSION MONITORING SYSTEM FOR COMPONENTS FOR FLUID BED CATALYTIC CRACKING PLANTS

This application is a national stage application claiming priority to PCT/IB132018/057969, now WO 2019/077467, filed on Oct. 15, 2018, which claims priority to Italian Patent Application Serial No. IT102017000116434, filed on Oct. 17, 2017.

BACKGROUND OF THE INVENTION

1. Field of the Invention

Subject of the present invention is an innovative erosion monitoring system for components exposed to wear, used in plants equipped with a fluidized catalyst, in particular in fluid-bed catalytic cracking plants, in English Fluid Catalytic Cracking (FCC), that is in plants for the conversion of oil fractions in finished products.

2. Brief Description of the Prior Art

Such plants implement a process through which light paraffinic hydrocarbons (e.g. petrol, LPG) are obtained by breaking the heavy paraffinic hydrocarbon molecules and from the crude oil distillation residues. In particular, purpose of the present invention is to monitor the erosion of the walls coated in refractory and/or anti-erosion material of such components.

Known Art

As known, fluid-bed catalytic cracking is one of the most important conversion processes used in oil refineries. It is widely used to convert the high-boiling, high molecular weight fraction of petroleum crude hydrocarbons into products of higher economic value such as gasoline, olefin gases and other similar products. Cracking of petroleum hydrocarbons, originally produced as thermal cracking, has nowadays been almost completely replaced by catalytic cracking as it produces a greater quantity of gasoline with a higher octane number. Catalytic cracking also permits to obtain, as a by-product, gaseous elements with higher olefin content, which are also more important than those produced by thermal cracking. Generally, the charge of a catalytic cracking plant consists of the portion of crude oil which has an initial boiling point of 340° C. or higher, at atmospheric pressure, and an average molecular weight of between about 200 and 600 or higher. The catalytic cracking process vaporizes and breaks down the long-chain molecules of the high-boiling liquid hydrocarbons, into much shorter molecules at high temperature and moderate pressure, by means of a fluidized powder catalyst. It is evident that all FCC plants as well as all plants using a fluidized catalyst have inside them parts subject to erosion, in which the erosion cannot be diagnosed by its thermal effects on the external walls. In fact, in all these plants, the walls subject to erosion are coated with anti-erosion material supported by a metal grating on which the anti-erosion coating is firmly anchored. The inability to monitor the erosion by means of its thermal effects may be due to the fact that the walls subject to erosion, such as the walls of the cyclones, do not border with the external environment. This may also be due to the fact that either the thickness of the materials subject to erosion or their particular conformation, for example made of orifices or plugs, or in general the interior of the valves, causes the amount of erosion which has to be monitored, to have effects negligible on the temperature of the boundary walls with the environment. In particular, this happens in valves operating with a fluid containing the catalyst, in which the consequences caused by the erosion of the interior of such valves occur long before the erosion has thermal consequences detectable from the outside of the valves themselves.

Therefore, there is a need to define an innovative system for monitoring the erosion of the walls of components subject to erosion in FCC plants, which is not based on the temperature variation.

Purpose of the present invention is therefore to monitor the progression of the erosion in a structure subject to particular wear from the passage of fluids, through the use of optical fibers, which is able to withstand the high temperatures (up to 900° C.) typical of the FCC systems, in the terminal portion of which one or more Bragg gratings (FBG) are present, which are themselves exposed to erosion which, thanks to their selective reflexivity, reflect a spectrum of light that depends on the depth of the erosion, thus allowing to measure it with millimeter precision.

SUMMARY OF THE INVENTION

Subject of the present invention is therefore an innovative system for monitoring the erosion of components in FCC plants comprising a plurality of optical fibers and a unit for analyzing and processing the light reflected by the optical fibers. The optical fibers are installed in such a way as to terminate immediately below the surface of the wall whose erosion is to be monitored, orthogonally to it in such a way as to shorten the same amount of erosion of the wall itself. The depth of the erosion is then measured as the shortening of the optical fiber itself calculated on the basis of the variation of the spectrum of light reflected by the optical fiber itself. The optical fiber must be mechanically protected and made almost indifferent to the thermal expansion of the materials that the optical fiber passes through. Therefore it is necessary to define suitable protection tubes and constraint systems. In particular, the constraint must act only on the distal portion of the optical fiber, in the immediate proximity of the area in which the erosion is to be monitored, whereas all other parts of the optical fiber must be free to flow inside the protection tube.

The assembly formed by the optical fiber and the protection tube inside which it is fixed, makes the erosion sensor.

In order to maximize the variation of the spectrum reflected from the optical fiber due to the shortening of the optical fiber, the optical fibers are provided with one or more Bragg gratings in their terminal portion, thereby the shortening of the optical fiber can be detected thanks the disappearance from the reflection spectrum of the wavelengths which are specific of Bragg gratings or of the portion of them destroyed by erosion.

Advantageously, the plurality of erosion sensors reaches the wall subject to wear due to erosion, passing through suitable cavities of support structures for anti-erosion coatings of the wall itself. After the subsequent application and drying of the anti-erosion coating, the erosion sensors are perfectly integrated in it. The dependent claims outline particular and further advantageous aspects of the invention.

BRIEF DESCRIPTION OF THE DRAWINGS

These and other advantages of the invention will now be described in detail, with reference to the accompanying drawings, which represent an exemplary embodiment of the invention, in which.

DETAILED DESCRIPTION OF THE INVENTION

Figure 1:
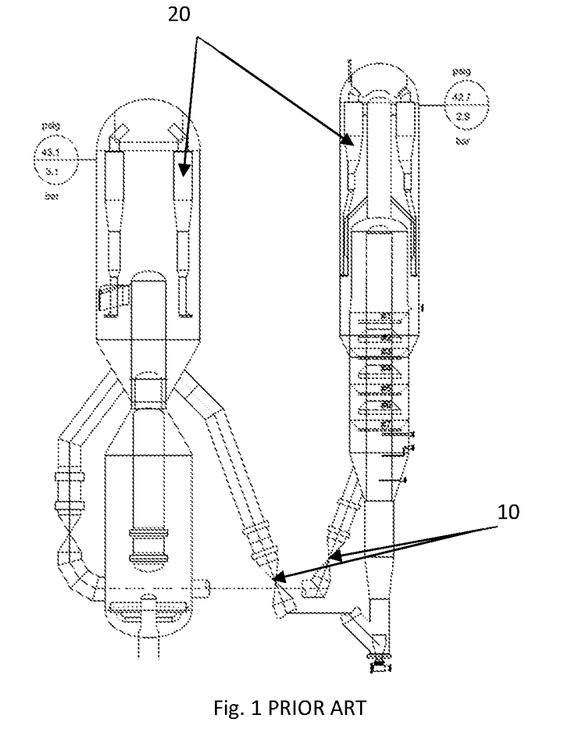
FIG. 1 shows a portion of a general scheme of the FCC plant.

With reference to FIG. 1, there is shown a portion of a general scheme of a FCC plant of known type, in which by way of example some components subject to erosion are shown, such as valves 10 and cyclones 20. Still by way of example, other components, not shown in the Figures, which are subjected to erosive phenomena, are the diffuser of air to the regenerator typically called FCC air grid or the reactor feed injection nozzles.

For these types of plants, the valves used are generally modulation valves with quick emergency closing function for blocking the plant, and sometimes (typically for Exxon process only) the two modulation and block functions are separated into two distinct valves disposed n series. These valves are typically called FCC slide valves.

Figure 2:
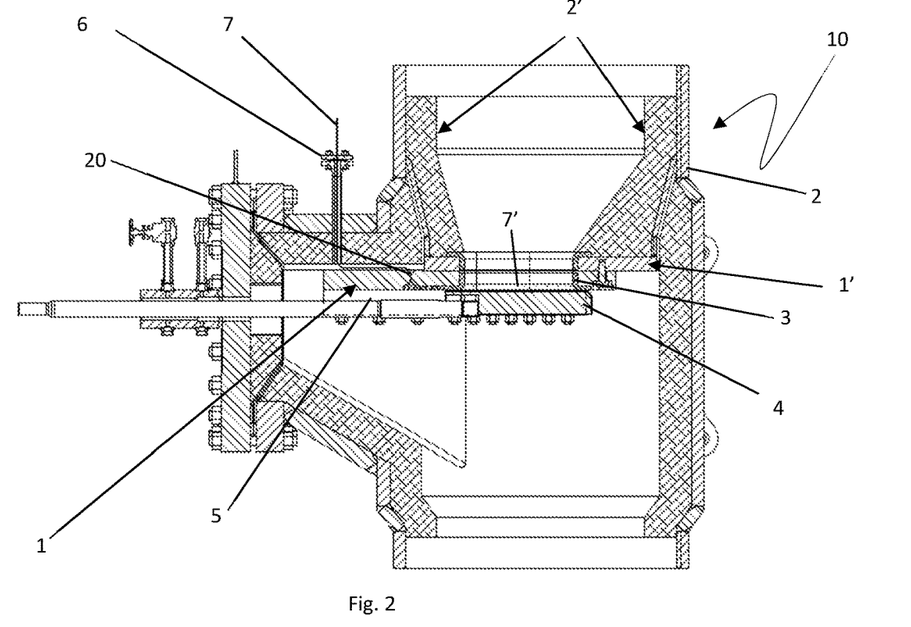
FIG. 2 shows a cross section of a valve of the plant of FIG. 1, to which is applied a first embodiment of the present invention.

The body of the valves 10 has a refractory coating 2' and the shutter disc 4 is constructed in a single piece coated on its entire upper and front surfaces and for more than 50% of its lower surface, with an abrasion-resistant material. Both the surfaces of the removable perforated plate 1, placed in correspondence with the shutter 4, and the surfaces of the supporting perforated plate T, placed above the plate 1, are exposed to the flows and therefore are coated with an erosion resistant material usually supported by radial brackets 11. Such radial brackets 11 are evenly spaced and thereto is firmly anchored the anti-erosion coating that fills completely the gap between the brackets 11. In particular, as shown in FIG. 2, the valve 10 comprises along the walls 2 a refractory material 2' and at the level of the removable perforated plate 1, an anti-erosion coating 3. The same anti erosion coating is also symmetrically present on the perforated support plate T to which the removable perforated plate 1 is fixed by means of tie rods. Finally, the sides and the lower portion of the shutter in contact with the sliding guides 5 are hardened with cobalt-based coatings.

Figure 3:
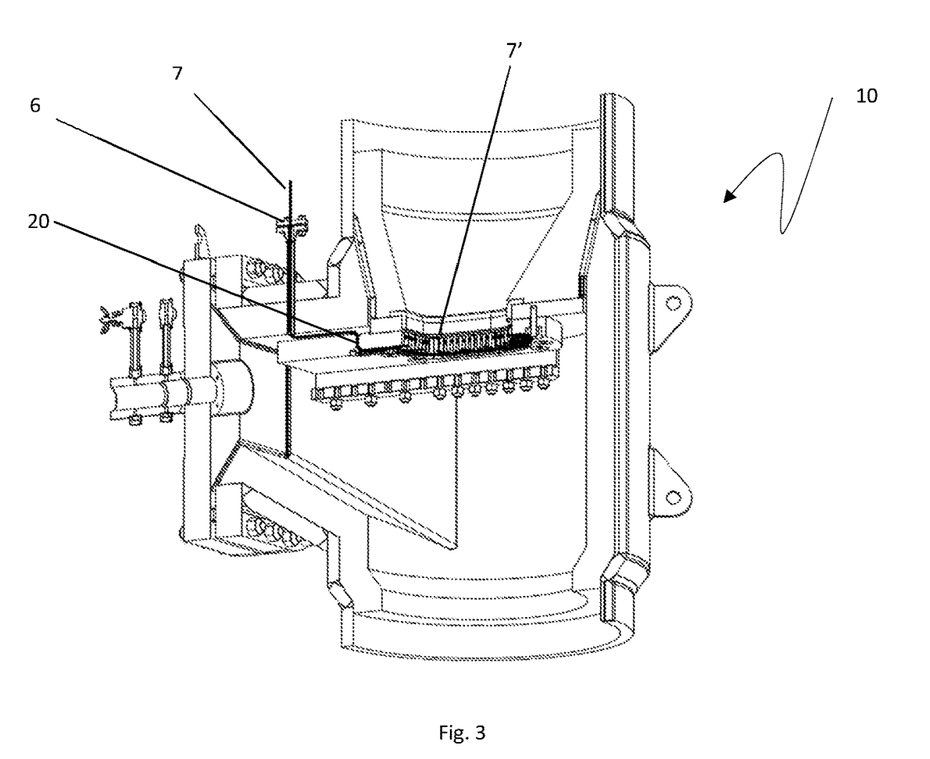
FIG. 3 shows a perspective cross section of the valve of FIG. 2.
Figure 4:
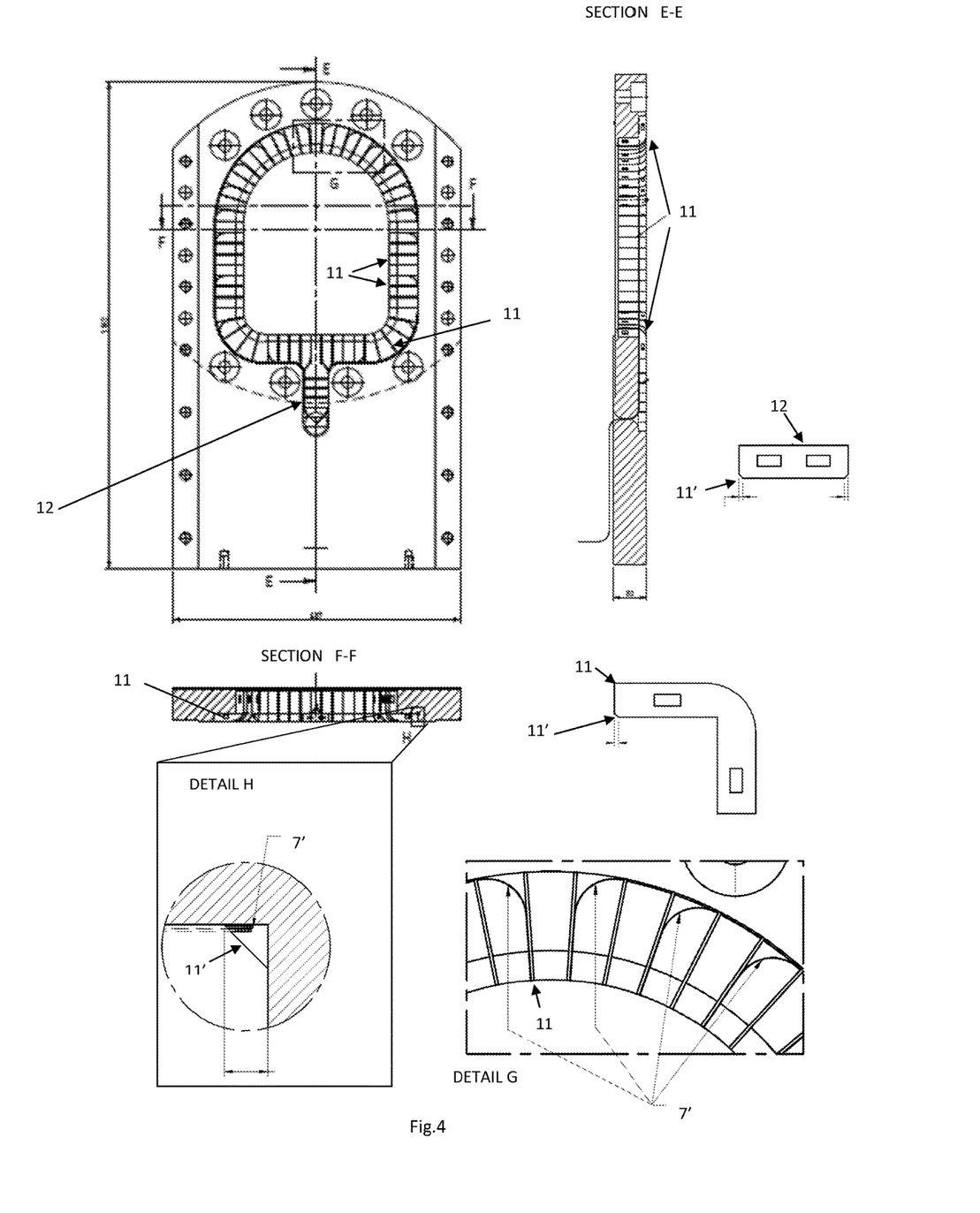
FIG. 4 shows, in section view and in some details, the removable orifice plate of the valve of FIG. 2.

The finding according to the present invention comprises a processing unit of a known and therefore not shown type, for example a Bragg grating analyzer or an OSA spectrometer or an optical fiber photocell amplifier combined with a circulating means carrying the light reflected by the erosion sensor towards the return channel of the amplifier. In other words, the processing unit analyzes the light reflected by the gratings and is provided with appropriate data processing code, and of plurality of fiber optic sensors, positioned in a substantially orthogonal way with respect to the wall subjected to wear by erosion. The optical fibers are provided with a structure comprising one or more Bragg gratings. According to a first embodiment of the present invention, which is absolutely non-limiting, a bundle 7 of fiber optic sensors 7' is inserted inside an inlet duct 6 which in FIGS. 2 and 3 is transverse to the shutter 4 of the valve 10, but it could have a more appropriate inclination in order to maximize the radius of curvature of the optical fibers. The bundle 7 of fiber optic sensors 7' reaches the surface of the removable perforated plate 1, the one facing the shutter 4, through an opening 20 of the removable perforated plate 1 itself. The opening 20 may be more suitably shaped and inclined in order to maximize the radius of curvature of the optical fibers and together with the inlet duct 6, in order to obtain a path as linear as possible for the optical fibers. Once the opening 20 has been crossed, the fibers reach the mouth of the removable plate 1, as shown in FIG. 4, passing through a special groove interspersed with plates 12, provided with special chamfers 11' for the passage of the optical fibers. The groove is coated with an anti-erosion material, supported by the plates themselves.

Figure 5:
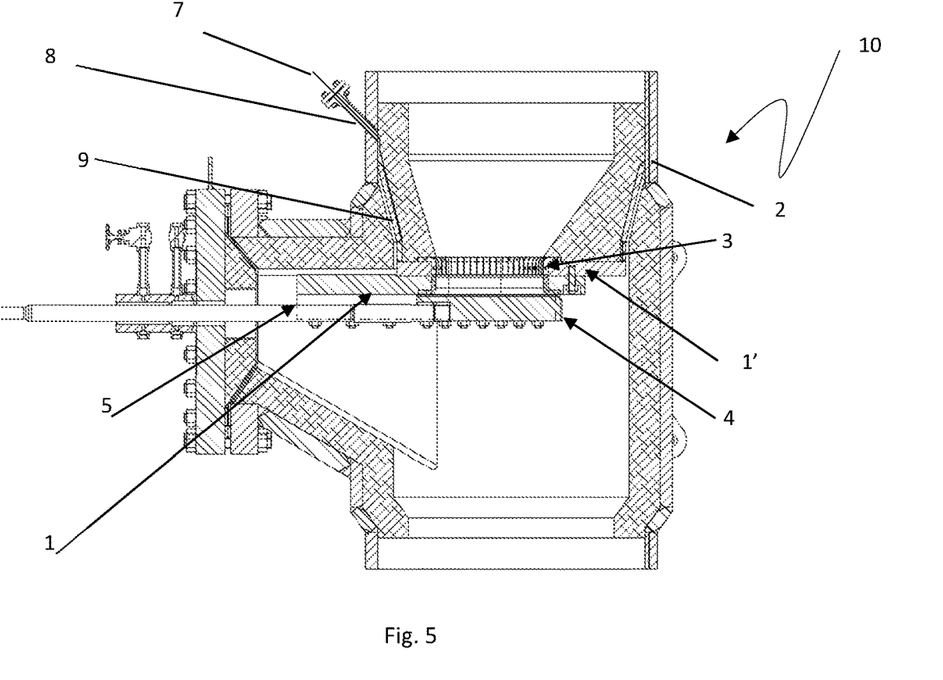
FIG. 5 shows a cross section of a valve of the plant of FIG. 1, to which is applied a second embodiment of the present invention.
Figure 6:
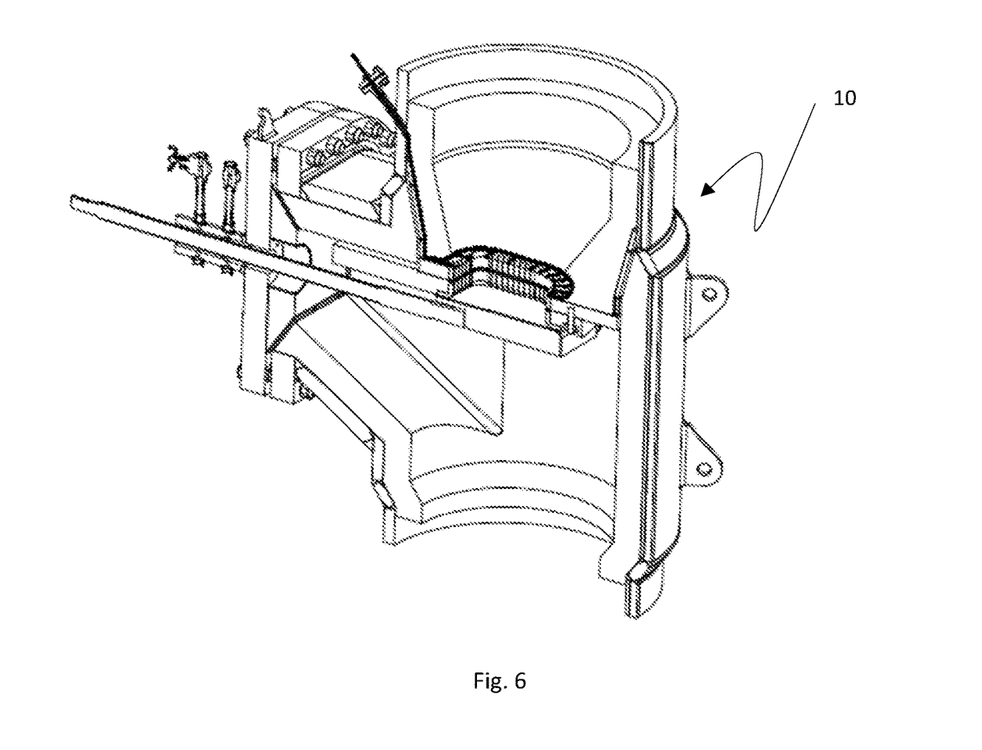
FIG. 6 shows a perspective cross section of the valve of FIG. 5.

According to a further also non-limiting embodiment of the present invention, the bundle 7 of fiber optic sensors 7' is inserted into an inlet duct 8 transverse to the wall 2 of the body of the valve 10 (FIGS. 5 and 6). The bundle 7 of fiber optic sensors 7' reaches a support plate 1' of the removable perforated plate 1. The bundle 7 arrives to the support plate T through a groove 9 of the valve itself. The two embodiments may be alternative or complementary. It is therefore possible that with the same valve 10 is monitored the erosion both at the level of the removable perforated plate 1 and at the level of the support plate T. In both embodiments, the bundle 7 of optical fibers develops around the removable perforated plate 1 and/or the support plate 1' and the individual optical fibers 7' are inserted, as shown in detail G of FIG. 4, on the removable perforated plate 1 and on the supporting plate 1' following the arrangement of the particular brackets 11 arranged along the perimeter of the passage area of the perforated plates 1, T to which they are welded. In order to allow the optical fibers 7' to pass through the brackets 11, in order to be able to arrange them along the entire perimeter of the fluid passage area, the brackets 11 must have a special chamfer 11' dedicated to the passage of the fibers 7'. This chamfer 11' is not present in the brackets normally available on the market for the support of the erosion resistant coating. Once the bundle of fiber optic sensors 7' as well as the individual optical fibers 7' are correctly positioned adhering to the walls of the brackets 11, the removable perforated plate 1 and/or the support plate T are covered by the anti-erosion coating 3, supported by the brackets 11, so filling the gap between them.

Figure 7:
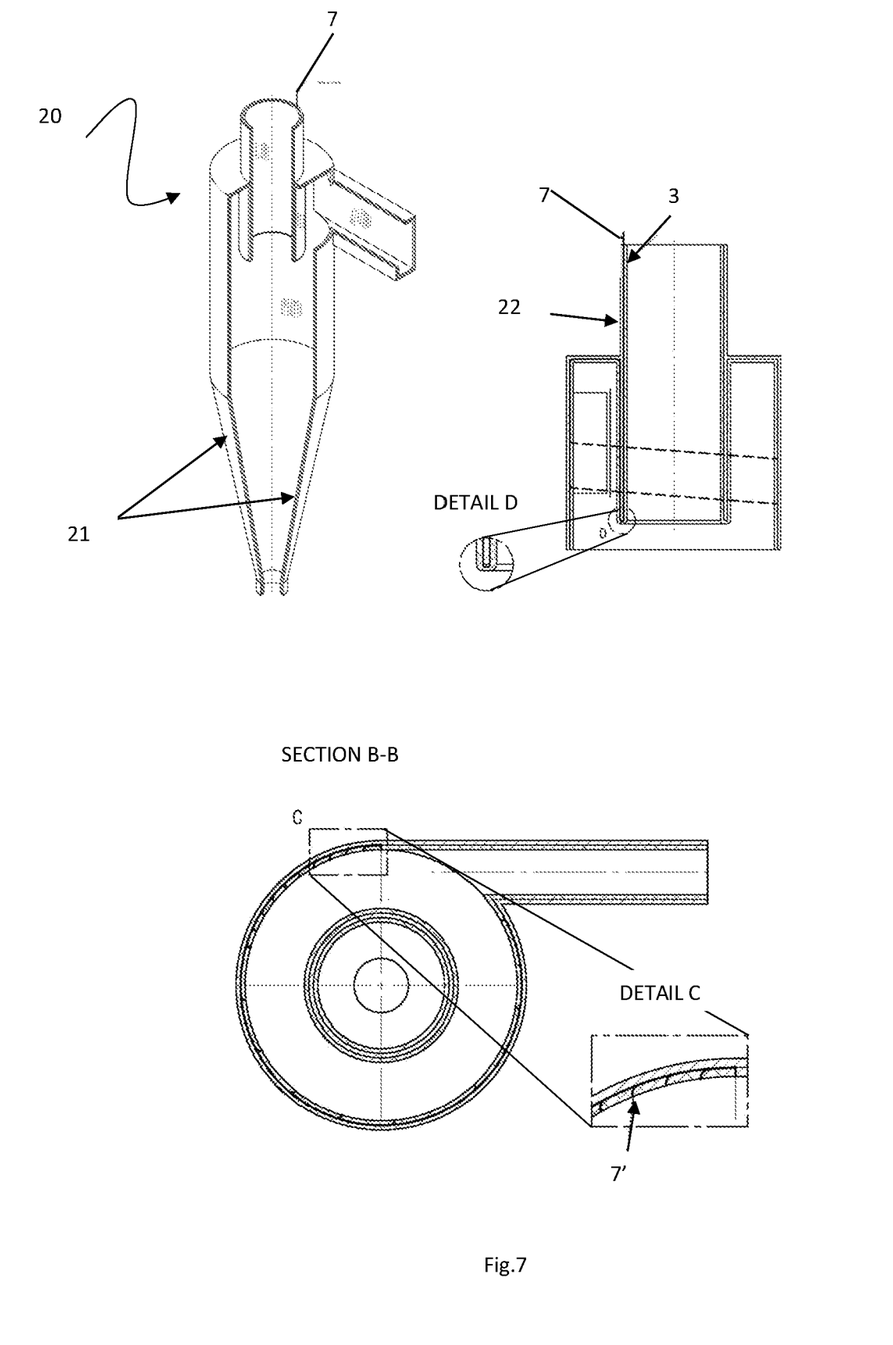
FIG. 7 shows a cutaway and two sections of a cyclone of the plant of FIG. 1, to which is applied a third embodiment of the present invention.
Figure 8:
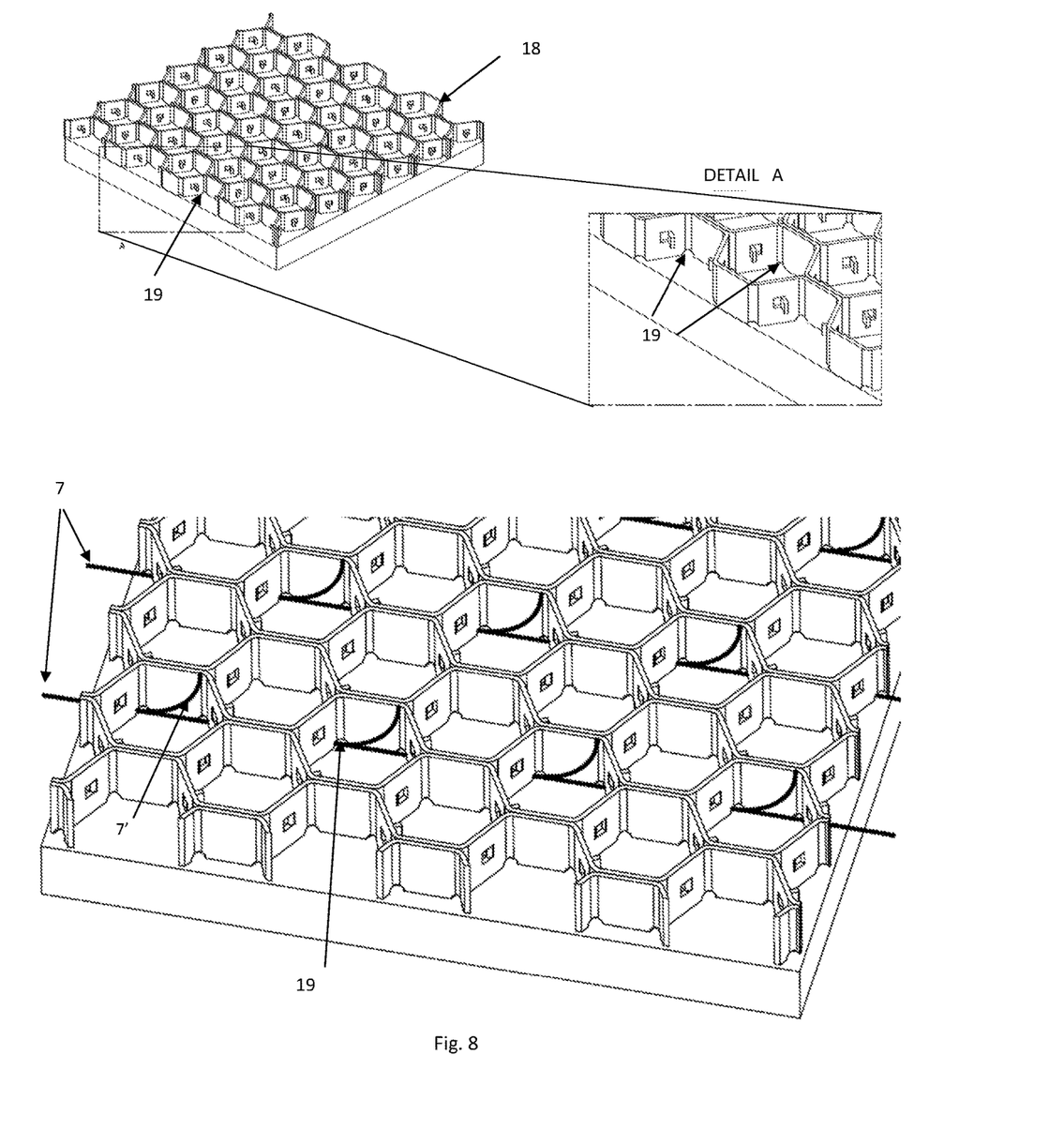
FIG. 8 shows a detail of the anti-erosion coating with hexagonal mesh.
Figure 9:
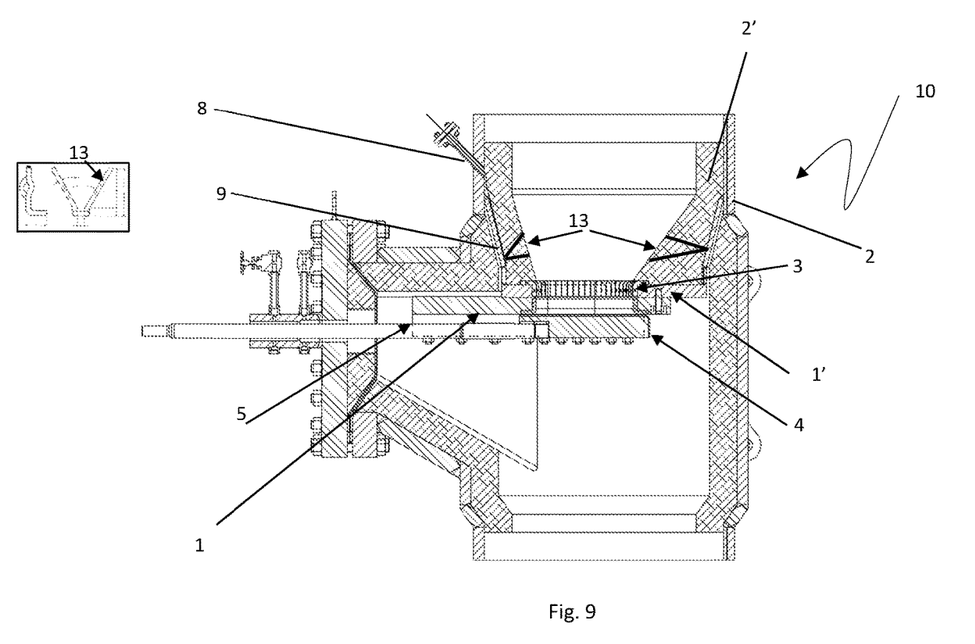
FIG. 9 shows a section of the valve of FIG. 5 and FIG. 6 to which is applied a further embodiment of the invention.

As shown in FIG. 7, the system for monitoring the erosion which is the subject of the present invention is also applied to the cyclones 20 of a FCC plant. In such cyclones 20, the bundle 7 of fiber optic sensors 7 'is passed through the entire length of the walls 2 1 between the outer coating of the sheet 22 and the inner anti-erosion coating 3. The detail of section B-B shows how the individual optical fibers 7' are evenly spaced within the anti-erosion coating 3, wherein the support structure with hexagonal meshes 18 (FIG. 8) has grooves 19 for the passage of the optical fibers 7' themselves, which grooves are not normally present in the hexagonal meshes for anchoring the anti-erosion material. This also applies to the surfaces of other components such as the regenerator air distributor and injection nozzles of the charge to the reactor and in general to any surface protected by anti-erosion coatings. This also applies to other variants of the supports for the anti-abrasive material, it being true that the optical fibers develop at the base of these supports which adhere to the surface to which the supports are fixed and typically welded, and then they emerge orthogonally to the surface to be monitored and orthogonally to the same. Preferably the supports for the anti-abrasive material must be provided with suitable grooves in order to allow the optical fibers to be stopped at their fixing base and positioned correctly before the application and drying of the anti-abrasive and/or refractory material. FIG. 9 shows a further embodiment of the monitoring system described by FIGS. 5 and 6, by means of which and due to the optical fibers arranged along the anchors profile, typically in a "V-shaped" way, which are always present in order to support the refractory 2', it is also possible to monitor the erosion in the conical portion of the valve body 10 coated with refractory 2'. Due to the fact that the refractory material is normally deposited by casting, in this particular area it is be necessary for the optical fibers to be introduced on appropriately anchored capillaries, in order to prevent breakage or displacement of the optical fibers 7' during casting.

In all configurations of the system in question, the particular path chosen for the optical fibers permits that in the areas where they are immersed in the anti erosion or in the refractory material, the optical fibers 7' are always adherent to at least one metallic surface or of the walls or a tube. This guarantees greater mechanical protection, both during application of the anti-erosion 3 and of the refractory 2', and during operation. The use of capillary tubes in steel alloys in which the optical fibers and/or the optical fiber bundles can slide, even where these are adherent to a metal surface, can however be considered in order to obtain a further mechanical protection beyond that offered by the walls. In all of the configurations of the system which is subject of the present invention, the optical fibers 7' comprise one or more non-uniform Bragg gratings, that is with progressive values of the reflection wavelength. Alternatively, optical fibers may be used comprising at least one sequence of uniform Bragg gratings with a length of 0.5 mm. In this way a sequence of uniform Bragg gratings can be arranged in order to obtain a progressive reflection wavelength starting from the grating nearest to the outer surface of the wall to be monitored and by proceeding backwards along the fiber. The overall length of the sequence of uniform Bragg gratings is equal to that which the non-uniform grating could have had, that is typically of 50 mm for application in the perforated plates 1 and T and of about 25 mm for application in the cyclone walls.

Due to the high temperatures involved, typically of 760° C., able to reach up to 900° C., in abnormal conditions the optical fibers comprising one or more Bragg gratings must be designed specifically for these temperatures. In particular, the optical fibers 7' must be coated or protected.

In order to mechanically protect the optical fiber and to make it immune to the thermal expansion of the materials that the optical fiber passes through, the optical fiber must be installed inside particularly thin capillary tubes, for example inside a hypodermic tube Gage size 24RW ID 0.31 mm OD 0.56 mm. The optical fiber must also be bound to such tube exclusively in a small portion near the terminal part in the immediate vicinity of the area in which the erosion is to be monitored, whereas all other portions of the optical fiber must be free to slide inside the capillary itself. In order to achieve this constraint between the fiber and the capillary, an alumina-based ceramic glue can be used, for example such as AREMCO CERAMABOND 618-N-VFG.

Taking into account that the bundle of optical fibers takes a long path, it is appropriate to distinguish the complete erosion of the Bragg grating from the possible breaking of the optical fiber at some point. Advantageously, a uniform sub-millimeter Bragg grating may be intended for the diagnosis of the rupture of the fiber and for this reason it is placed to a much greater distance than that exposed to erosion. In this way, the total absence of light reflected by the optical fiber will occur only in case of fiber breakage and not in the case of complete erosion of the portion to be monitored.

Advantageously, due to the very high cost of Bragg grating analyzers for the continuous measurement of erosion, the present invention can also be used for the on/off measurement of the erosion, such as the exceeding of a limit value. In this case a single Bragg grating can be used positioned at the limit depth: the reaching of the limit erosion will be signaled by the absence of reflected light easily detectable with an economical optical fiber photocell amplifier, connected to the Bragg grating by optical circulation means, possibly integrated in the amplifier itself.

According to a preferred embodiment, the optical fibers may be arranged along multiple axes, for example two or three axes orthogonal to each other. As a matter of fact, the optical fiber comprising one or more Bragg gratings can monitor the depth of the erosion along a single axis.

Taking into account the slowness of the erosion phenomenon, by using the optical switch with a single central light analyzer, either a Fiber Bragg gratings analyzer or a photocell amplifier with circulation means, one at a time a large number of fiber optic sensors can be addressed, with a sampling interval on the single point which is much lower than the time necessary for the erosion to vary significantly.

Although at least one exemplary embodiment has been presented in the summary and the detailed description, it must be understood that there exists a large number of variants falling within the scope of protection of the invention. Furthermore, it must be understood that the embodiment or the embodiments presented are only examples that do not intend to limit in any way the scope of protection of the invention or its application or its configurations. Rather, the brief description and the detailed description provide the skilled technician with a convenient guide for implementing at least one exemplary embodiment, since it is clear that numerous variations can be made in the function and assembly of the elements described therein, without departing from the scope of protection of the invention, as established by the appended claims and their technical-legal equivalents.

The invention claimed is:

1. A fluidized catalyst system comprising: at least a valve (10), at least a cyclone (20), wherein at least said valve (10) and said cyclone (20) are exposed to erosion, the system also comprising an erosion monitoring apparatus comprising a bundle (7) of fiber optic sensors (7'), said optical fibers (7') being provided of one or more Bragg gratings, and a processing unit, said system being characterized by the fact that the fiber optic sensors (7') depart from the bundle (7) and are positioned orthogonally with respect to a wall exposed to erosion wear and belonging to the components (10, 20) to be monitored.

2. The system according to claim 1, wherein said bundle (7) of fiber optic sensors (7') is configured to reach the wall exposed to erosion wear, through suitable cavities (11', 19) of support structures (11, 18) of anti-erosion coatings (3) of the same wall.

3. The system according to claim 1, wherein each of said optical fibers (7') is
accommodated inside capillary tubes and is constrained by gluing to said tube near the wall subjected to erosion wear.

4. The system according to claim 1, wherein said bundle (7) of fiber optic sensors (7') is accommodated inside an inlet duct (6) orthogonally to the shutter (4) of a the valve (10) up to a surface of a removable perforated plate (1), facing the shutter (4) through and provided with an opening (20).

5. The system according to claim 1, wherein said bundle of sensors (7) with optical fibers (7') is accommodated inside an inlet conduit (8)
orthogonally to a wall (2) of the valve body (10) up to a support plate (1') of the removable perforated plate (1) of the valve (10).

6. The system according to claim 5, wherein said removable perforated plate (1) and/or said support plate (1') are covered by the anti-erosion coating (3), supported by metal brackets (11) to which the anti-erosion coating (3) is anchored, and where special scraps (11') are realized on said brackets (11) to allow the passage of optical fiber sensors (7').

7. The system according to claim 5, wherein said bundle (7) of fiber optic sensors (7') is configured to reach the support plate (1') through a groove (9) of the valve (10).

8. The system according to claim 7, wherein said bundle (7) of fiber optic sensors (7') is positioned around a removable perforated plate (1) and/or around the support plate (1') and the individual fiber optic sensors (7') the arrangement of the brackets (11) which are evenly spaced along the perimeter of the removable perforated plate (1) and/or of the support plate (1').

9. The system according to claim 2, further comprising a FCC regenerator air grid or a feed injection nozzle of the charge of a reactor, wherein the bundle (7) of fiber optic sensors (7') in the cyclone (20) or in the FCC regenerator air grid or in the feed injection nozzle of the charge of a reactor, is accommodated inside the entire length of the walls (21) of the cyclone (20) or of the distributor or of the nozzle itself, between an outer coating sheet (22) and the internal anti-erosion coating (3).

10. The system according to claim 9, wherein said optical fibers (7') are uniformly spaced within the anti-erosion coating (3) and a hexagonal mesh support structure (18) has grooves (19) for the passage of the optical fibers (7') themselves.

11. The system according to claim 1, wherein the fiber optic sensors (7') has a structure comprising at least one non-uniform Bragg grating or at least one sequence of uniform Bragg gratings.

12. The system according to claim 1, wherein said optical fiber sensors (7') are accommodated in one or more steel capillaries having protection and/or threading functions.

13. The system according to claim 1, wherein said processing unit is a Bragg grating analyzer or an OSA spectrometer or an optical fiber photocell amplifier combined with a circulation means which carries the light reflected by the erosion sensor towards the return channel of the amplifier.

14. The system according to claim 1, wherein the fiber optic sensors (7') are arranged along two or three axes orthogonal to each other and the processing unit is provided with optical switches configured to acquire, one at a time, the data from more than one fiber optic sensor (7').

* * * * *